United States Patent [19]
Gao et al.

[11] Patent Number: 5,756,230
[45] Date of Patent: May 26, 1998

[54] FLUOROPOLYMER BLENDS FOR POLYMERIC ELECTROLYTE AND ELECTRODES

[75] Inventors: Feng Gao, Henderson; Porter H. Mitchell, Las Vegas, both of Nev.

[73] Assignee: Valence Technology, Inc., Henderson, Nev.

[21] Appl. No.: 897,037

[22] Filed: Jul. 18, 1997

Related U.S. Application Data

[63] Continuation of Ser. No. 667,055, Jun. 20, 1996, abandoned.

[51] Int. Cl.$^6$ .................................................. H01M 6/18
[52] U.S. Cl. .................. 429/192; 429/217; 429/223; 429/224
[58] Field of Search ....................... 429/191, 192, 429/212, 217, 218, 223, 224, 94

[56] References Cited

U.S. PATENT DOCUMENTS

| | | | |
|---|---|---|---|
| 4,925,751 | 5/1990 | Shackle et al. | 429/191 |
| 5,460,904 | 10/1995 | Gozdz et al. | 429/192 |
| 5,540,741 | 7/1996 | Gozdz et al. | 429/192 X |

OTHER PUBLICATIONS

Kynar® and Kynar Flex® Technical Brochure, Elf Atochem.

Kynar® Technical Brochure, 1990 Atochem North America, Inc., Plastics Department, Three Parkway, Philadelphia, PA 19102, pp. 1–11.

EANA–Battery Presentation, Final Approved Copy, Jun. 11, 1995, John P. Williams & Company, Inc., pp. 5–6, 9–10, 11–12, 1 un–numbered page and 27–28.

Electrochimica Acta. vol. 28, No. 5 pp. 591–595, 1983, Conduction of Lithium Ions in Polyvinylidene Fluoride and its Derivative–I, by Eishun Tsuchida, Hiroyuki Ohno and Koichi Tsunen, 1983 Pergamon Press, Ltd.

Electrochimica Acta. vol. 28, No. 6 pp. 833–837, 1983, A Mechanism of Ionic Conduction of Poly (Vinylidene Fluoride)–Lithium, by, Koichi Tsunen, Hiroyuki Ohno and Eishun Tsuchida, 1983 Pergamon Press, Ltd.

*Primary Examiner*—Anthony Skapars
*Attorney, Agent, or Firm*—Charles Jew

[57] ABSTRACT

A method of improving the structural integrity of the binder and polymeric matrix components of electrochemical cell precursors by employing polymer blends comprising fluoropolymers is provided. The method forms porous polymeric structures that enhances the mass transport of ions in the cell which results in improved electrochemical performance. Films or webs of electrochemical cell precursors comprising the fluoropolymer blends are flexible which enhances processability.

18 Claims, No Drawings

5,756,230

FLUOROPOLYMER BLENDS FOR POLYMERIC ELECTROLYTE AND ELECTRODES

This application is a continuation of application Ser. No. 08/667,055, filed Jun. 20, 1996, now abandoned.

BACKGROUND OF THE INVENTION

1. Field of the Invention

This invention relates to fabricating non-aqueous electrochemical (electrolytic) cells and, more particularly, to employing fluoropolymer blends in the polymeric matrix of the solid electrolyte layer and/or as the binders in the electrodes. The fluoropolymer blends improve the flexibility and structural integrity of the polymeric matrix of the electrolyte and of the anode and cathode.

2. State of the Art

Non-aqueous lithium ion electrochemical cells typically include an anode, a lithium electrolyte prepared from a lithium salt dissolved in one or more organic solvents and a cathode of an electrochemically active material, typically an insertion compound. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium ion passes from the carbon through the electrolyte to the cathode where it is taken up just as in a cell with a metallic lithium anode. During recharge, the lithium ion is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium ion electrochemical cells are discussed in U.S. Pat. Nos. 4,472,487, 4,668,595 and 5,028,500.

Various factors influence the performance of electrochemical cells. For instance, the morphology of the polymeric matrix and of the polymeric binders in the anode and/or cathode can affect conductivity of the salts. Enhancement of conductivity has been demonstrated by forming porous polymeric matrices and polymeric binders. One method of producing such porous structures comprises forming polymeric structures in the presence of a plasticizer; upon extraction of the plasticizer, pores are created in the polymer. A problem associated with this method of fabricating porous structures is that they become rigid and brittle following extraction. The anode and polymeric electrolyte structures are particularly susceptible to this phenomenon. This makes assembling electrochemical cell difficult particularly in continuous mass production.

SUMMARY OF THE INVENTION

The present invention is directed to electrochemical cells and methods of fabricating them wherein the anode, cathode, and/or polymeric matrix comprises a fluoropolymer blend.

In one aspect, the invention is directed to an electrochemical cell comprising:

an anode comprising a carbon material and a first polymer;

a cathode comprising a cathode active material and a second polymer; and a polymeric matrix comprising a third polymer that is laminated between the anode and the cathode, wherein at least one of said first, second, and third polymer comprises a fluoropolymer blend.

In another aspect, the invention is directed to a method of preparing an electrochemical cell comprising of the steps of:

forming an anode composition comprising a carbon material and a first polymer;

forming a cathode composition comprising a cathode active material and a second polymer;

forming a polymeric composition comprising a third polymer, wherein said polymeric composition is laminated between said anode and cathode and wherein at least one of said first, second, or third polymer comprises a fluoropolymer blend; and placing an electrolyte solution comprising an electrolyte solvent and a salt into said anode, cathode, polymeric compositions.

One feature of the invention is that the electrochemical cell precursors comprising the anode, cathode, and polymeric (separator) electrolyte layer can be prepared in the form of long webs that are rolled into cylinders for easy storage and transport even following extraction of the plasticizer from the precursors. This feature allows the inventive process to be adapted for continuous fabrication of electrochemical cells. Specifically, electrochemical cells are fabricated by first unrolling the electrochemical cell precursors and thereafter activating the precursors by placing an electrolyte solution therein. Individual cells are preferably cut from the web prior to being packaged. With the inventive fluoropolymer blends, the polymer binders of the anode and cathode and the polymeric layer of the electrolyte do not become brittle and crack under stress. In particular, the anode, cathode, and polymeric layer retain their structural integrities even when webs of electrochemical cell precursor are rolled following extraction.

DETAILED DESCRIPTION OF PREFERRED EMBODIMENTS

The present invention is based in part on the discovery that employing a polymer blend which includes fluoropolymers in the polymeric matrix and binder materials significantly improves the structural integrities of the polymeric matrix of the electrolyte layer and of the anode and cathode. In particular, it is expected that following extraction of the plasticizer, the electrochemical cell precursor can be further processed without becoming brittle. For example, a long web of the precursor can be rolled into a cylinder structure for storage and later use. During assembly of electrochemical cells, the flexible web of the electrochemical cell precursor is unraveled from its cylinder. The web is cut prior to or after activation to form individual electrochemical cells. Electrochemical cells fabricated by the inventive process are expected to demonstrate superior electrochemical performance.

Preferred electrochemical cells include (1) a cathode comprising an active material, (2) an intercalation based carbon anode, with each electrode comprising a polymer binder and capable of reversibly incorporating (e.g., intercalating) an alkali metal ion, and (3) a polymeric matrix containing an electrolyte solution comprising an organic electrolyte solvent and a salt. Each electrode preferably has a current collector. Particularly preferred electrochemical cells and batteries use lithium and salts thereof.

Preferably, the anode comprises an anode film that is laminated onto one or both sides of a current collector which is a thin metal foil or grid. Typically, each anode film is from about 100 μm to about 250 μm in thickness, preferably about 110 μm to about 200 μm, and more preferably about 125 μm to about 175 μm.

Similarly, preferably the cathode comprises a cathode film that is laminated onto one or both sides of the current collector which is a thin foil or grid. Typically, each cathode film is from about 100 μm to about 200 μm in thickness, preferably about 130 μm to about 175 μm, and more preferably about 140 μm to about 165 μm.

The anode and cathode each also preferably includes a current collector that comprises, for example, a screen, grid, expanded metal, woven or nonwoven fabric formed from an electron conductive material such as metals or alloys. Preferably, the current collector has a thickness from about 25 μm to about 75 μm, preferably about 35 μm to about 65 μm, and more preferably about 45 μm to about 55 μm. Each current collector is also connected to a current collector tab which extends from the edge of the current collector. In batteries comprising multiple electrochemical cells, the anode tabs are preferably welded together and connected to a copper or nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

Prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability by liquid solvents including, for example, diethyl ether, dimethyl ether, methanol, cyclohexane, and mixtures thereof or by supercritical fluids. Preferred plasticizers include, for example, dibutyl phthalate, dioctylphthalate, and acetates, glymes and low molecular weight polymers. The plasticizer is preferably first well mixed with a polymer and a solvent. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the electrolyte solution. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of a salt and electrolyte solvent into an electrochemical cell precursor. After activation, the electrochemical cell is charged by an external energy source prior to use.

The term "electrochemical cell" or "electrolytic cell" refers to a composite structure containing an anode, a cathode, and polymeric matrix with a electrolyte solution that is interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by a casting process which does not require the use of monomers or prepolymers, that is, no curing is required. The present invention employs a fluoropolymer blend that is dissolved in acetone or other suitable solvent(s). Upon casting the solution the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The solid polymeric matrix of the present invention comprises a polymer blend which includes fluoropolymers. A polymer blend is a physical combination or mixture of two or more different polymers. The individual polymers of the blend can be homopolymer(s), copolymer(s), terpolymer(s), and mixtures thereof.

Fluoropolymer blends of the present invention are physical mixtures of two or more different fluorine-containing polymers that are not linked by covalent bonds. By "fluorine-containing polymers" is meant fully fluorinated fluorocarbons, including polytetrafluoroethylene and its fully fluorinated copolymers, and fluoroplastics which are polymers that contain hydrogen or chlorine in addition to fluorine. The fluoropolymer blends can be dissolved in the appropriate solvent so that upon casting of the solution containing the blend and evaporation of the solvent the solid polymeric matrix is formed. Further, the blends should be sufficiently compatible so that the different fluorine-containing polymers do not separate into discrete phases on being mixed. Moreover, the blend must be compatible with the other components used in fabricating the electrochemical cell. Specifically, the fluoropolymer blends must be suitable for use as a polymer binder for the anode material and the cathode material and as a polymer matrix that serves as the polymeric separator layer in the electrochemical cell.

Preferred polymers, copolymers, and terpolymers that comprise the fluoropolymer blends include, for example, the following homopolymer, copolymers, and terpolymers. Preferred homopolymer include, for example: polychlorotrifluoroethylenes, polyhexafluoropropylenes, polyperfluoroalkoxytrifluoroethylenes, polytetrafluoroethylenes, polyvinylfluorides and mixtures thereof. Homopolymer typically have a molecular weight in the range of 50,000 to 900,000. Preferred copolymers include, for example: poly(perfluoroethylene-co-perfluorovinyl ether)s, poly(tetrafluoroethylene-co-ethylene)s, poly(tetrafluoroethylene-co-propylene)s, poly(vinlylidene difluoride-co-chlorotrifluroethylene)s, poly(vinylidene difluoride-co-ethylene)s, poly(vinylidene difluoride-co-hexafluoroisobutylene)s, poly(vinylindene difluoride-co-hexafluoropropylene)s, poly(vinylidene difluoride-co-propylene)s and mixtures thereof. Copolymers typically have a molecular weight in the range of 10,000 to 900,000). Preferred terpolymers, include for : poly(vinylidene difluoride-co-hexafluoropropylene-co-tetrafluoroethylene)s with a molecular weight in the range of 10,000 to 900,000.

The blends can comprise binary, tertiary, and higher combinations of the different fluorine-containing polymers.

The relative amounts of the individual polymers in the blend can vary depending on the physical characteristics desired for the blend. A critical limitation is that the blend formulated be suitable for use as the polymer binder for the anode and cathode and as the polymeric layer in the electrolyte.

For blends comprising a homopolymer and a copolymer, the relative weight percentage of the homopolymer preferably ranges from about 90% to 50% and more preferably about 85% to 60% and most preferably about 80% to 70%. For blends comprising a homopolymer and a terpolymer, the relative weight percentage of the homopolymer preferably ranges from about 95% to 60%, more preferably about 90% to about 65%, and most preferably about 85% to 70%. Similarly, for blends comprising two different copolymers, for example, a first copolymer and a second copolymer that is elastomeric, the relative weight percentage of either copolymer preferably ranges from about 95% to 5%, more preferably about 90% to 65%, and more preferably about 85% to 75%. Finally, for blends comprising a copolymer and terpolymer (elastomeric), the relative weight percentages of the copolymer preferably range from about 97% to 70%, more preferably from about 95% to 75%, and most preferably about 92% to 85%.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate.

The term "organic carbonate" refers to hydrocarbyl carbonate compounds of preferably no more than about 12 carbon atoms and which do not contain any hydroxyl groups. Preferred organic carbonates include, for example, aliphatic carbonates and cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl1,3-dioxolan-2-one; 4,5-diethyl- 1,3-dioxolan-2-one; 4,4-diethyl-1,3-dioxolan-2one; 1,3-dioxan-2-one; 4,4-dimethyl-1,3-dioxan-2-one; 5,5-dimethyl-1-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. The carbon intercalation based anode precursors typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The polymeric binder of the anode for the present invention preferably comprises a polymer blend which includes fluoropolymers as further described above. In one preferred embodiment, the carbon intercalation anode precursor (that is, the anode structure prior extraction) comprises from about 40 to about 70 weight percent of a carbon material (e.g., graphite); from about 8 to about 20 weight percent of a polymeric binder; and from about 15 to about 40 weight percent plasticizer. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $LixNiO_2$ and $Li_xCoO_2$ wherein $0<x\leq2$. Blends can also include $Li_y$-α-$MnO_2$ ($0\leq y<1$) which has a hollandite-type structure. 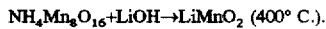 where $0\leq y<0.5$ is preferred. α$MnO_2$ can be synthesized by precipitation from a reaction between a $MnSO_4$ solution and $(NH_4)_2S_2O_8$ as an oxidizing agent.

Lithiation (also referred to as "prelithiation") of α$MnO_2$ can be accomplished via a solid state reaction:

$$NH_4Mn_8O_{16} + LiOH \rightarrow LiMnO_2 \ (400°\ C.).$$

Li-α-$MnO_2$ retains the same structure as Hollandite. See, Botkovitz et. al., J. of Power Sources, 43–44 (1993) 657–665, which is incorporated herein, for a discussion of the structure and electrochemical characteristics of Li-α-$MnO_2$. $Li_y$-α-$MnO_2O$ $0\leq y<0.5$ is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. The polymeric binder may comprise EPDM, PVDF, EAA, EVA, or EAA.EVA copolymers, and the like. Suitable binders for use in the cathode have a molecular weight of from about 1,000 to 5,000,000. The polymeric binder of the cathode for the present invention preferably comprises a polymer blend which includes fluoropolymers as further described above.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of a suitable polymeric binder comprising the polymer blend; from about 0 to about 20 weight percent of polyethylene oxide having a number average molecular weight of at least 100,000; and from about 10 to 50 weight percent of solvent comprising a 10:1 to 1:4 (w/w) mixture of an organic carbonate and a glyme. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed. The electrolyte composition further typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent. The electrolyte composition moreover comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

METHODOLOGY

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive method can be adapted to form porous anode, cathode, and/or polymeric matrix and binder structures in prior art electrochemical cells. The following illustrates a method of how an electrolytic cell could be fabricated with the inventive process.

An electrolytic cell is prepared by first preparing a cathodic slurry that is preferably laminated onto both sides of a current collector web to form an anode precursor. Similarly, an anode slurry is preferably laminated onto both sides a current collector web to form a cathode precursor. Alternatively, instead of a current collector web, the anode or cathode slurry can be laminated onto a non-conductive web such as a polymer substrate. Finally, the polymeric matrix which serves as the separator layer is formed by casting a polymer solution onto a web substrate. Thereafter, a plasticized electrochemical cell precursor is formed by positioning a web of the polymeric matrix between the film of the anode precursor and the film of the cathode precursor. Thereafter, the tri-layer structure is heated to about 130° C. to 140° C. for about 2 minutes to fuse the three layers. Following lamination, the plasticizer is extracted from the electrochemical precursor. For large scale production, a web of the electrochemical precursor can be rolled into a cylinder for storage and shipment. Due to the presence of the fluoropolymer blends in the polymeric matrix and/or polymer binders of the anode and cathode, the precursor is sufficiently flexible so that the tri-layer web does not become brittle and crack even when rolled into a cylindrical structural. Moreover, after storage the web can be readily unrolled to yield the electrochemical cell precursor.

To produce individual electrochemical cells, an electrolyte solution comprising a solvent and a salt is added into the electrochemical cell precursor; thereafter, individual cell precursors are fabricated by cutting the elongated web of the electrochemical cell precursor into the appropriate size. Alternatively, the electrochemical cell precursors can be cut to size prior to activation. An elongated web of the electrochemical cell precursor preferably is of sufficient length that 1000 or more electrochemical cells can be produced when the web is cut to produce individual cells. Depending on the size of the electrochemical cells to be fabricated, such elongated webs can be from about 20 to about 120 meters in length and longer if desired and can be from about 14 to 40 cm in width and wider if desired.

The following illustrates a method of how an electrolytic cell could be fabricated with the inventive process. Examples 1 and 2 describe the process of preparing the anode and cathodes, respectively. Example 3 describes the procedures for fabricating a solid electrolytic cell.

The invention will be described using the anode and cathode structures wherein electrode materials (or films) are laminated onto both sides of the current collectors, however, it is understood that the invention is applicable to other configurations, for example, where one side of the anode and/or cathode current collector is laminated. In the following examples, the fluoropolymer blend employed refers to any suitable fluoropolymer blend described above.

EXAMPLE 1

The anode current collector employed is a sheet of expanded copper metal that is about 50 μm thick. It is available under the designation 2Cu5-125 (flatten) from Delker, Corp. in Branford, Conn.

The anode slurry is prepared as follows:

A polymer mixture is formed by mixing 6.9 grams of a fluoropolymer blend in 20 grams of acetone. The mixture is stirred for about 24 hours in a milling jar available from VWR Scientific, in San Francisco, Calif., model H-04172-00. The fluoropolymer blend functions as a binder for the carbon in the anode.

A graphite mixture is prepared separately by first adding 23.4 grams of graphite into 0.9 grams of carbon black into a solution containing 60 grams acetone, and 10.5 grams dibutyl phthalate. A preferred graphite comprises a 50:50 (by weight) mixture of a synthetic graphite available under the designation SFG-15™ from Lonza G & T. Ltd. (Sins, Switzerland) and graphitized mesocarbon microbeads available under the designation MCMB2528™ from Osaka Gas Co., Japan. A preferred carbon black is available under the designation Super P™ from M.M.M. Carbon, Willebroek, Belgium. The graphite mixture is then vigorously mixed in a high shear mixer until a substantially homogeneous blend is formed. A suitable mixer is available from Ross, Model ME100DLX, Hauppauge, New York, operating at its highest setting (about 10,000 RPM) for 30 minutes.

The anode slurry is prepared by mixing the fluoropolymer mixture and the graphite mixture together under low shear conditions to form the anode slurry wherein the components are well mixed. A portion of the acetone is allowed to evaporate from the slurry before it is laminated onto each side of the current collector. Anode films form when the remaining portion of the acetone evaporates.

EXAMPLE 2

The cathode current collector employed is a sheet of expanded aluminum that is about 50 μm thick. The aluminum grid is available under the designation 2AL5-077 from Delker, Corp.

The cathode slurry is prepared as follows:

A polymer mixture is formed by mixing 4.4 grams of a fluropolymer blend in 15 ml of acetone. The mixture is stirred for about 24 hours in a milling jar.

A cathode mixture is prepared separately by first adding 28.9 grams of a cathode-active material blend comprising $Li_xMn_2O_4$ (spinel) ($0 \leq x < 2$), 2.4 grams of carbon black (Super P™) into a solution containing 60 grams acetone, and 8.7 grams dibutyl phthalate. The mixture is then vigorously mixed in the a high shear mixer until a substantially homogeneous blend is formed.

The cathode slurry is prepared by mixing the polymer mixture and the graphite mixture together under low shear conditions to form the anode slurry wherein the components are well mixed. A portion of the acetone is allowed to evaporate from the slurry before it is laminated onto each side of the current collector. Cathode films form when the remaining portion of the acetone evaporates.

The above anode and cathode films are formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The lamination causes the polymeric components of the anode and cathode precursors to adhere to the polymeric layer. The pressure and temperature employed will depend on the polymer(s) forming the polymer matrix. The polymeric matrix is formed by casting a polymeric slurry comprising acetone, dibutyl phthalate, silanized fumed $SiO_2$, and a fluoropolymer on a suitable substrate or carrier web and allowing the acetone to evaporate. No curing by radiation is required. The $SiO_2$ is a filler which impart toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

Similarly, in preparing the polymer mixture for both the anode and cathode slurries, preferably the polymer(s) not be subject to high shear so as to be degraded. Furthermore, preferably the polymer(s) employed has a high average molecular weight. Preferably the average molecular weight is between 50K to 750K, more preferably 50K to 200K, and most preferably 50K to 120K. Furthermore, it is preferred that polymers forming the fluoropolymer blend have a narrow molecular weight have range.

The dibutyl phthalate plasticizer is extracted using conventional organic liquid solvents such as diethyl ether or by a supercritical fluid which includes, for example, a gas (e.g., $CO_2$) that is compressed and heated to either supercritical or subcritical conditions to achieve liquid-like densities. A preferred supercritical fluid is carbon dioxide.

The electrochemical cell precursors are packaged in moisture-impermeable material which is described, for example, in U. S. Pat. No. 5,326,653 which is incorporated herein. The precursor is activated by the above process.

Extraction and activation preferably take place in an inert (e.g., argon) atmosphere. Finally, the packaging is sealed.

In this example, the electrochemical cell fabricated comprises a tri-layer laminate having an anode, electrolyte (or separator), and cathode. This structure preferably has a thickness ranging from about 0.3 mm to about 0.7 mm. As is evident, the present invention is applicable to batteries having multilayer anode/cathode structures. In another preferred embodiment the battery comprises a five-layer laminate comprising: (1) a cathode, (2) separator, (3) anode, (4) second separator, and (5) a second cathode, wherein each cathode and anode has a current collector which is coated with electrode material on both sides. This five-layer structure preferably has a thickness ranging from about 0.6 mm to about 1.4 mm.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. An electrochemical cell comprising:

an anode comprising a carbon material and a first polymer;

a cathode comprising a cathode active material and a second polymer; and a polymeric matrix comprising a third polymer that is laminated between the anode and the cathode, wherein at least one of said first, second, and third polymer comprises a fluoropolymer blend which is a physical mixture of two or more different fluorine containing polymers that are not linked by covalent bonds.

2. The electrochemical cell of claim 1 wherein the fluoropolymer blend comprises a homopolymer that is selected from the group consisting of polychlorotrifluoroethylenes, polyhexafluoropropylenes, polyperfluoroalkoxytrifluoroethylenes, polytetrafluoroethylenes, polyvinylfluorides and mixtures thereof.

3. The electrochemical cell of claim 2 wherein the fluoropolymer blend comprises a copolymer that is selected from the group consisting of poly(perfluoroethylene-co-perfluorovinyl ether)s, poly(tetrafluoroethylene-co-ethylene)s, poly(tetrafluoroethylene-co-propylene)s, poly(vinlylidene difluoride-co-chlorotrifluroethylene)s, poly(vinylidene difluoride-co-ethylene)s, poly(vinylidene difluoride-co-hexafluoroisobutylene)s, poly(vinylindene difluoride-co-hexafluoropropylene)s, poly(vinylidene difluoride-co-propylene)s and mixtures thereof.

4. The electrochemical cell of claim 2 wherein the fluoropolymer blend comprises a terpolymer that is poly(vinylidene difluoride-co-hexafluoropropylene-co-tetrafluoroethylene)s.

5. The electrochemical cell of claim 1 wherein the fluoropolymer blend comprises a copolymer that is selected from the group consisting of poly(perfluoroethylene-co-perfluorovinyl ether)s, poly(tetrafluoroethylene-co-ethylene)s, poly(tetrafluoroethylene-co-propylene)s, poly(vinlylidene difluoride-co-chlorotrifluroethylene)s, poly(vinylidene difluoride-co-ethylene)s, poly(vinylidene difluoride-co-hexafluoroisobutylene)s, poly(vinylindene difluoride-co-hexafluoropropylene)s, poly(vinylidene difluoride-co-propylene)s and mixtures thereof.

6. The electrochemical cell of claim 5 wherein the fluoropolymer blend comprises a terpolymer that is poly(vinylidene difluoride-co-hexafluoropropylene-co-tetrafluoroethylene)s.

7. The electrochemical cell of claim 1 wherein said cathode active material is selected from the group consisting of lithiated manganese oxides, lithiated cobalt oxides, lithiated nickel oxides and mixtures thereof.

8. The electrochemical cell of claim 1 wherein the anode comprises a carbon based intercalation material.

9. The electrochemical cell of claim 8 wherein the carbon based intercalation material is selected from the group consisting of graphite, coke, mesocarbon and mixtures thereof.

10. The electrochemical cell of claim 1 wherein each of said first, second, and third polymer comprises a fluoropolymer blend.

11. The electrochemical cell of claim 10 wherein the fluoropolymer blend comprises a homopolymer that is selected from the group consisting of polychlorotrifluoroethylenes, polyhexafluoropropylenes, polyperfluoroalkoxytrifluoroethylenes, polytetrafluoroethylenes, polyvinylfluorides and mixtures thereof.

12. The electrochemical cell of claim 11 wherein the fluoropolymer blend comprises a copolymer that is selected from the group consisting of poly(perfluoroethylene-co-perfluorovinyl ether)s, poly(tetrafluoroethylene-co-ethylene)s, poly(tetrafluoroethylene-co-propylene)s, poly(vinlylidene difluoride-co-chlorotrifluroethylene)s, poly(vinylidene difluoride-co-ethylene)s, poly(vinylidene difluoride-co-hexafluoroisobutylene)s, poly(vinylindene difluoride-co-hexafluoropropylene)s, poly(vinylidene difluoride-co-propylene)s and mixtures thereof.

13. The electrochemical cell of claim 11 wherein the fluoropolymer blend comprises a terpolymer that is poly(vinylidene difluoride-co-hexafluoropropylene-co-tetrafluoroethylene)s.

14. The electrochemical cell of claim 10 wherein the fluoropolymer blend comprises a copolymer that is selected from the group consisting of poly(perfluoroethylene-co-perfluorovinyl ether)s, poly(tetrafluoroethylene-co-ethylene)s, poly(tetrafluoroethylene-co-propylene)s, poly(vinlylidene difluoride-co-chlorotrifluroethylene)s, poly(vinylidene difluoride-co-ethylene)s, poly(vinylidene difluoride-co-hexafluoroisobutylene)s, poly(vinylindene difluoride-co-hexafluoropropylene)s, poly(vinylidene difluoride-co-propylene)s and mixtures thereof.

15. The electrochemical cell of claim 11 wherein the fluoropolymer blend comprises a terpolymer that is poly(vinylidene difluoride-co-hexafluoropropylene-co-tetrafluoroethylene)s.

16. The electrochemical cell of claim 10 wherein said cathode active material is selected from the group consisting of lithiated manganese oxides, lithiated cobalt oxides, lithiated nickel oxides and mixtures thereof.

17. The electrochemical cell of claim 10 wherein the anode comprises a carbon based intercalation material.

18. The electrochemical cell of claim 17 wherein the carbon based intercalation material is selected from the group consisting of graphite, coke, mesocarbon and mixtures thereof.

* * * * *